United States Patent [19]

Tabuchi et al.

[11] Patent Number: 4,926,273
[45] Date of Patent: May 15, 1990

[54] APPARATUS AND METHOD FOR RECORDING AND REPRODUCING INFORMATION SIGNALS

[75] Inventors: Koichi Tabuchi; Shigeo Kizu, both of Yokohama, Japan

[73] Assignee: Kabushiki Kaisha Toshiba, Kanagawa, Japan

[21] Appl. No.: 205,338

[22] Filed: Jun. 10, 1988

[30] Foreign Application Priority Data

Jun. 11, 1987 [JP] Japan .................. 62-144065

[51] Int. Cl.⁵ .......................... G11B 15/14; G11B 5/52
[52] U.S. Cl. ........................................ 360/64; 360/61; 360/108
[58] Field of Search ............ 360/61, 64, 67, 108, 360/68, 84

[56] References Cited

U.S. PATENT DOCUMENTS 4,455,584 6/1984 Heitmann ........................ 360/108
4,605,974 8/1986 Ochi et al. ........................ 360/64
4,737,867 4/1988 Ishikawa et al. .................. 360/61

FOREIGN PATENT DOCUMENTS 0121714 9/1979 Japan ..................................... 360/64
0163203 8/1985 Japan ..................................... 360/64
0201502 10/1985 Japan .
0242502 12/1985 Japan ..................................... 360/64
1042702 3/1986 Japan .

OTHER PUBLICATIONS

Tokkai 60-201502, Hayashi et al., Oct. 12, 1985.
Tokkai 61-42702, Ochi, Mar. 1, 1986.

Primary Examiner—Vincent P. Canney
Assistant Examiner—Surinder Sachar
Attorney, Agent, or Firm—Finnegan, Henderson, Farabow, Garrett and Dunner

[57] ABSTRACT

Magnetic recording and reproducing apparatus including a rotary head drum and power system. The rotary head drum includes at least a rotary head and preamplifier mounted therein. A rotary transformer communicates information signals to/from the rotary head drum and also transmits high-frequency powers signals for operating the pre-amplifer. The transmission occurs at time periods during which recording and reproducing action cannot be performed.

11 Claims, 11 Drawing Sheets

APPARATUS AND METHOD FOR RECORDING AND REPRODUCING INFORMATION SIGNALS

BACKGROUND OF THE INVENTION

The present invention relates to a magnetic recording and reproducing apparatus and, more particularly, to such apparatus which includes signal processing circuitry mounted upon a rotary head drum.

Magnetic tape recording and reproducing apparatus, such as video cassette recorders (VCRs), used for processing video signals or other high density, large-volume digital data must handle recording and reproduced signals of high frequency. In such applications, an arrangement is known in which a recording/reproducing head is mounted on a rotary head drum and magnetic tape is transported across the drum while the drum is rotated, thereby enhancing the relative head-to-tape speed.

Figure 3A:
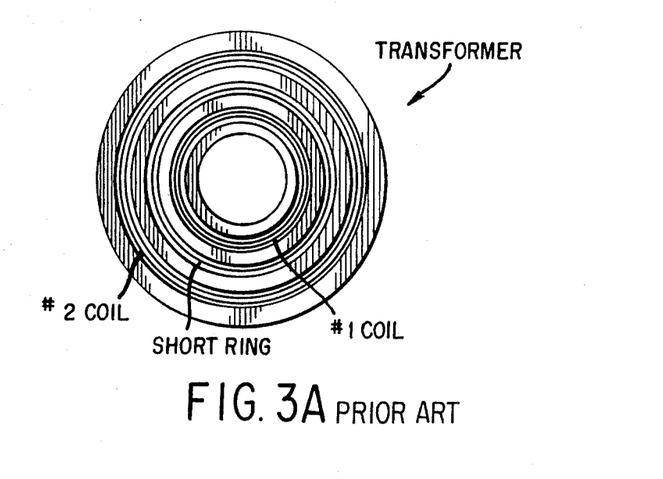
FIGS. 3A and 3B show, respectively, an overhead view and a cross sectional view of a prior art rotary transformer.
Figure 3B:
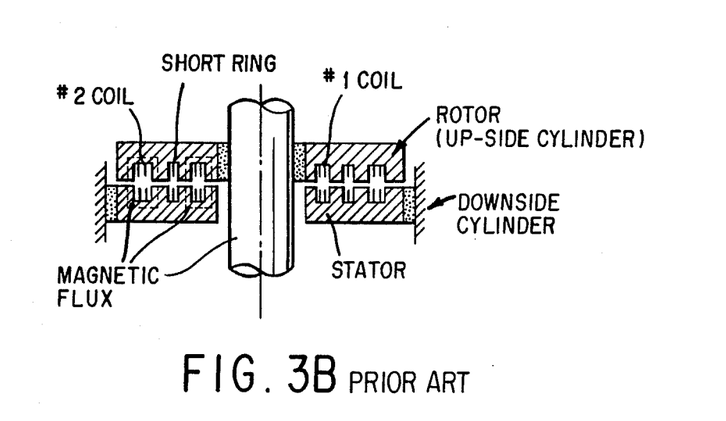

The transmission of recording and reproduced signals, as shown in FIG. 3, is generally implemented using a rotary transformer and achieved using a coil of a rotor in an upside (rotary) cylinder and a coil of a stator in downside fixed cylinder. Prior art VCRs for public use and broadcasting service require amplification by a pre-amplifier inside the rotary head drum, since the reproduced signals from the magnetic head are very weak. The pre-amplifier is mounted inside the rotary head drum to reduce noise between the magnetic head and the pre-amplifier and avoid a degradation of S/N (signal to noise) ratio caused by the transmission loss of the rotary transformer. The longer the distance between the magnetic head and the pre-amplifier, the more the stray capacitance between them increases. This adversely affects wideband signal transmission characteristics.

Figure 1:
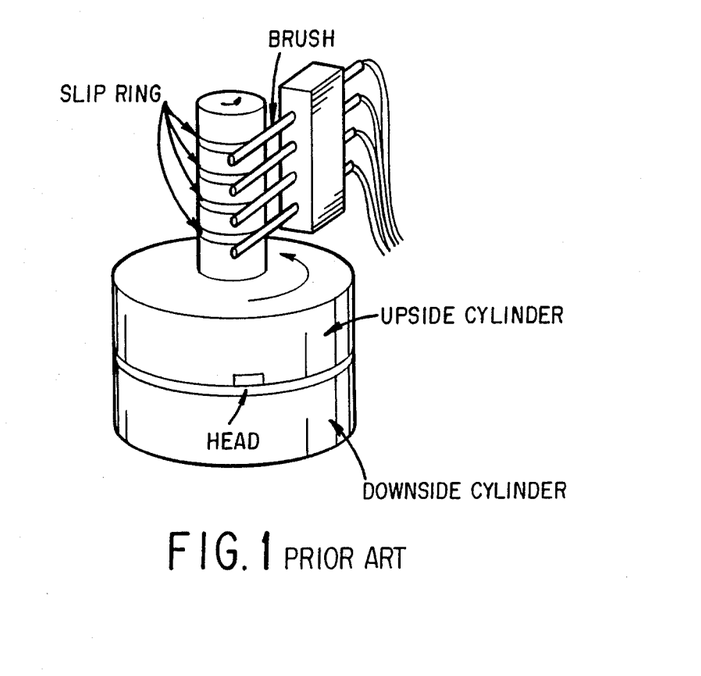
FIG. 1 is a perspective view of a prior art rotary head drum, using slip rings and brushes.
Figure 2:
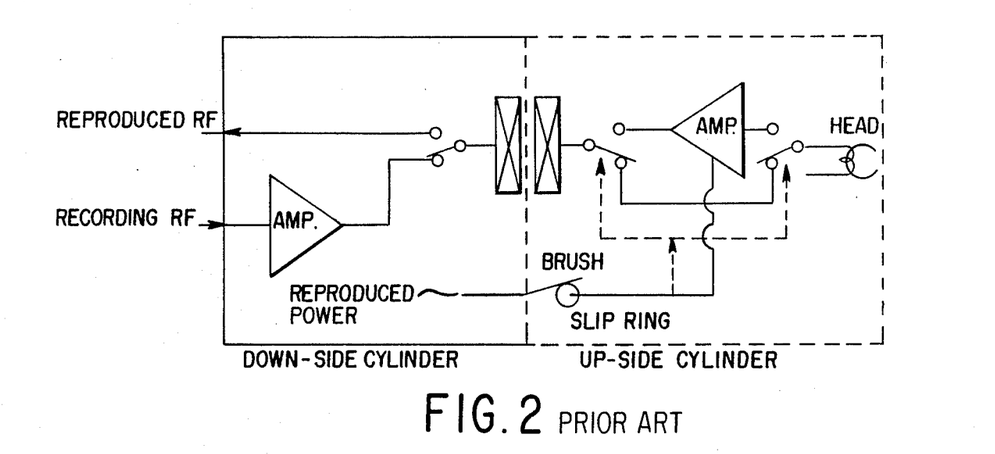
FIG. 2 is a schematic diagram of the apparatus of FIG. 1.

When a pre-amplifier is mounted inside the rotary head drum, as described above, operating power must be supplied to it. In the past, transmission of operating power to the reproducing preamplifier required the use of slip rings and brushes, as shown in FIGS. 1 and 2. Operating power and recording/reproducing change-over signals, etc. from the brushes were transmitted by the slip rings which rotate with the upside cylinder of the rotary head drum.

With this arrangement, however, imperfect contact between the slip rings and brushes occurred as they became worn and dirty, causing a voltage drop from the supply source. This in turn led to unstable operation of the reproducing pre-amplifer and resulted in the generation of noise. Hence, there was a need for the periodic maintenance and service of slip rings and brushes.

Recently, instead of slip rings and brushes, it has been proposed that operating power be transmitted by another rotary transformer (as shown in Japanese Tokkai Nos. 60-201502 and 61-42702). However, use of another rotary transformer for providing the operating power creates a space problem, particularly in the case of recording and reproduced high-definition signals and digital TV signals, since a plurality of rotary transformers are required for transmitting recording and reproduced signals.

SUMMARY OF THE INVENTION

It is one object of this invention to overcome the foregoing problems of the prior art, and to provide a maintenance-free, operation-stable, high-performance magnetic recording and reproducing apparatus which is capable of supplying operating power on a non-contact basis to signal processing circuits provided inside a rotary head drum.

In addition, since this invention utilizes the coil of the rotary transformer as means for power transmission, the rotary head drum needs no additional mechanical parts, and certain conventional parts, such as slip rings and brushes, can be eliminated, thereby resulting in a simpler, lower cost structure.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

In accordance with the principles of the present invention, there is provided apparatus for recording and reproducing information signals to and from magnetic tape comprising a rotating assembly rotatable through a plurality of angular positions during repetitive cycles that include a first and a second time period, a fixed assembly, and a magnetic head mounted on the rotating assembly for recording and reproducing information signals to and from magnetic tape. The apparatus further comprises a rotary transformer having a first winding mounted on the fixed assembly and a second winding mounted on the rotating assembly, first signal processing means within the fixed assembly for processing the information signals, first power supply means in the fixed assembly for generating a first power signal, and first switch means for connecting the first winding to the first signal processing circuit during the first time period and connecting the first winding to the first power supply means during the second time period. Finally, the invention comprises second signal processing means mounted within the rotating assembly and connected to the head for processing the information signals, second power supply means within the rotating assembly and connected to the first signal processing circuit for converting the first power signal to operating power for the second signal processing circuit, and second switch means for connecting the second winding to the second signal processing means during the first time period and for connecting the second winding to the second power supply means during the second time period.

In another aspect, the invention comprises a method for supplying operating power to signal processing circuits mounted in a rotating head assembly of information signal recording and reproducing apparatus, the apparatus including a rotary transformer having a fixed winding and a rotating winding for transmitting information signals from the rotating head assembly, the head assembly operating over repetitive cycles including a first period when recording and reproducing operations may take place and a second period when recording and reproducing operations are not possible. The method comprises the steps of generating power signals, transmitting information signals from the rotating head assembly during the first time period, transmitting power signals to the rotating head assembly during the second time period, and converting the power signals to operating power for the signal processing circuits.

The accompanying drawings, which are incorporated in and constitute a part of this specification, illustrate one embodiment of the invention, and, together with the description, serve to explain the principles of the present invention.

DETAILED DESCRIPTION OF THE PREFERRED EMBODIMENTS

An omega-wound one-head helical scan VCR, which constitutes a first embodiment of the invention, will now be described.

Figure 4:
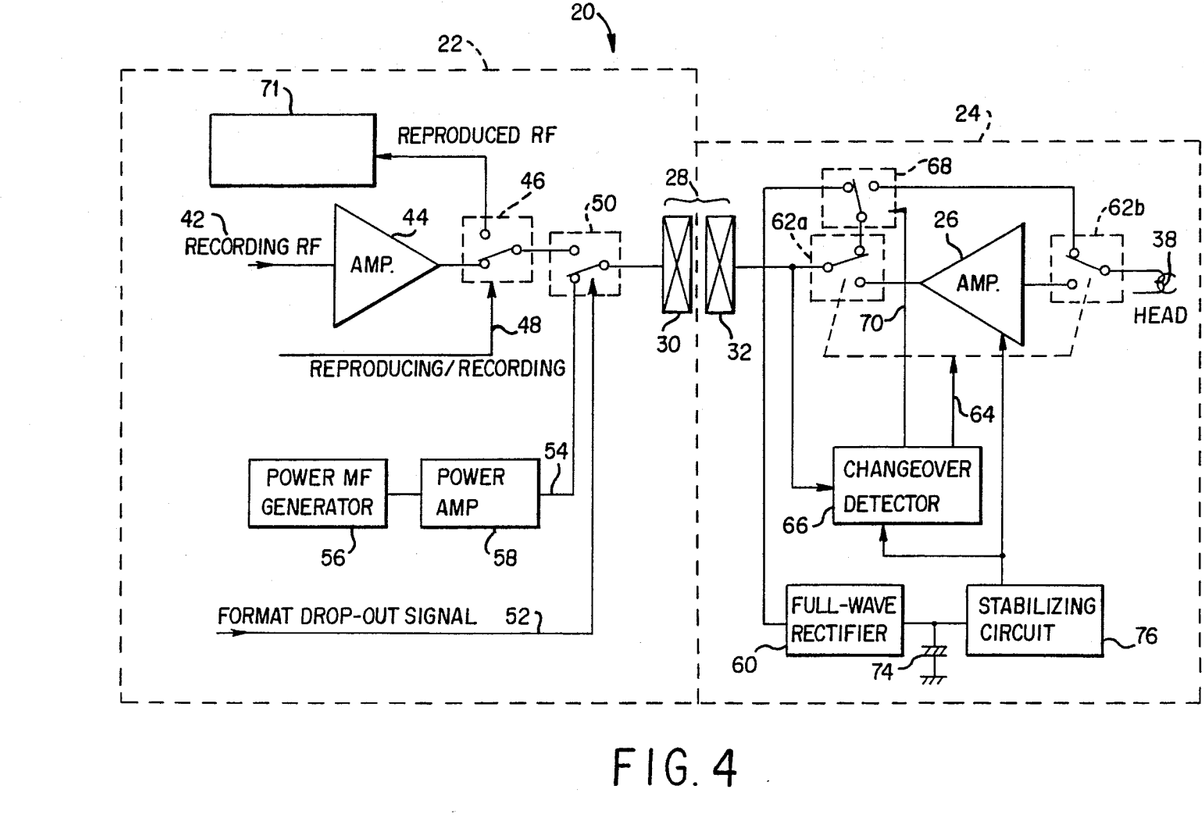
FIG. 4 is a block diagram of magnetic recording and reproducing apparatus which constitutes a first embodiment of the invention.

FIG. 4 is a block diagram showing a rotary head drum assembly 20, including fixed and rotary assemblies 22 and 24, which forms a part of the VCR. The VCR, constituting magnetic recording and reproducing apparatus, has a reproducing preamplifier 26 accommodated in the rotary assembly 24. Assembly 20 also includes a rotary transformer 28 including fixed and rotary coils respectively constituting primary and secondary windings 30 and 32 used to transmit a high-frequency power signal, a recording signal, and a reproduced signal.

Figure 5:
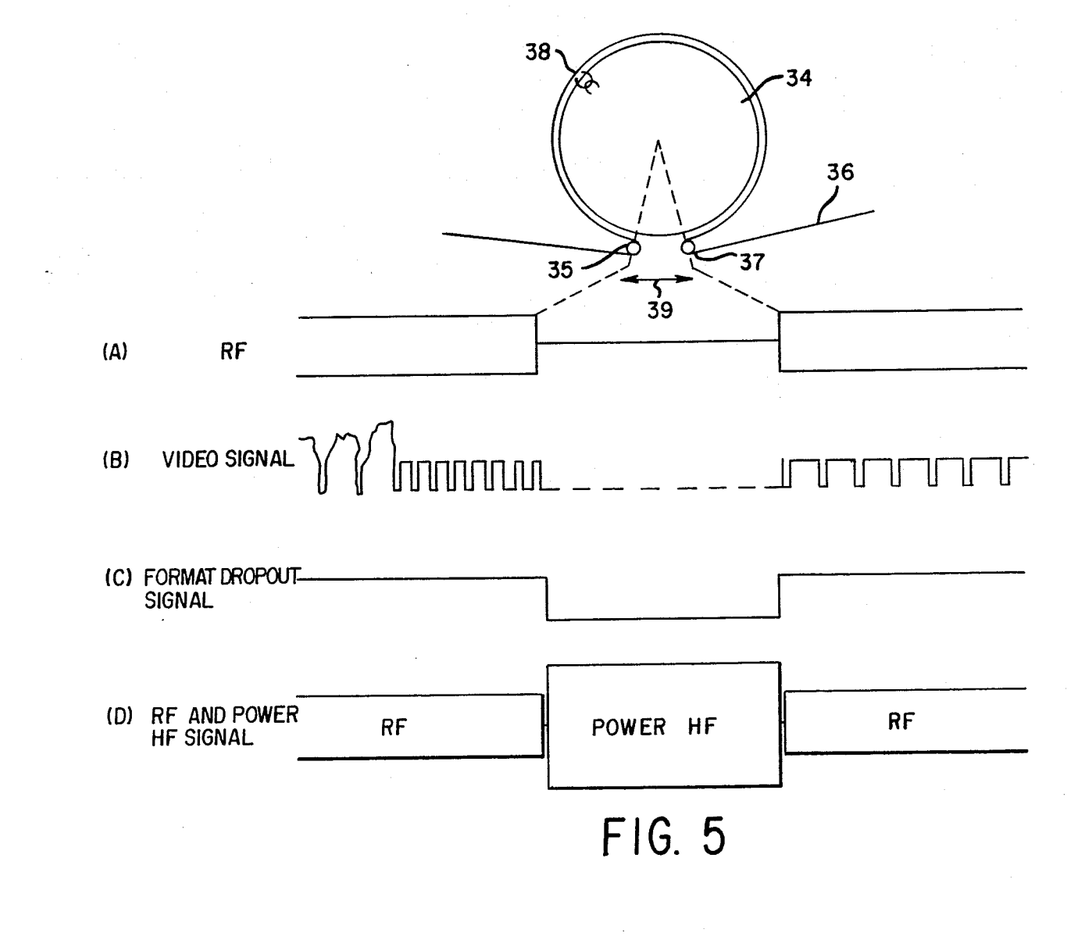
FIG. 5 is a timing diagram showing the relationship of the contact between a rotary head and a magnetic tape, and timing signals produced by the apparatus of FIG. 4.

FIG. 5 is a diagram showing a rotary head drum 34 which is part of rotary assembly 24 of the VCR and its relation to electrical signals produced by the VCR. As rotary drum 34 rotates, a magnetic tape 36 is obliquely scanned by a head 38 to perform recording and reproducing. In operation, magnetic tape 36 is helically wound about rotary head drum 34 while it traveling from a tape entrance guide 35 to a tape exit guide 37. However, in the space of an interval indicated by 39, magnetic tape 36 does not contact rotary head drum 34, thereby providing the recording and reproduced signals with a format drop-out period. This period is about 600 microseconds in duration when the drum is rotating at 3600 rpm. Rotary assembly 24 including drum 34 thus rotates through a plurality of angular positions during repetitive cycles. Each cycle includes a first time period during which tape 36 is in contact with head drum 34 and a second time period represented by the format drop-out period.

In FIG. 4, a recording RF (Radio Frequency) signal 42 amplified by a recording amplifier 44 passes through a switch 46 controlled by a recording/reproducing changeover signal 48, and through a switch 50 controlled by a format drop-out signal (See FIG. 5 waveform C). The invention thus includes first switch means for connecting the first winding to the first signal processing means during the first time period and connecting the first winding to the first power supply means during the second time period. Preferably, the first switch means comprises switch means responsive to a first control signal for connecting the first winding to the first signal processing circuit during the first time period and connecting the first winding to the first power supply means during the second time period. As embodied herein, the first switch means comprises switch 50.

Preferably, the invention further includes first signal supply means responsive to the angular position of the rotating assembly for supplying the first control signal. As embodied herein, the first signal supply means comprises a line 52 carrying the format drop-out signal. From now on, line 52 will be referred to as format drop-out signal 52.

The invention may also include third switching means responsive to a third control signal for selectively connecting the reproduction signal processing circuit and the recording signal processing circuit to the first switch means As embodied herein, the third switching means comprises switch 46.

Format dropout signal 52 is generated by a position sensor on the drum motor (not shown) and has the same timing as that of the format drop-out period created on the basis of rotary head drum clock pulses. Recording RF signal 42 is supplied to rotary transformer primary winding 30 (equivalent to a down-side cylinder) during all periods except the format drop-out periods. During the format drop-out periods, a sinusoidal wave power signal 54 having a frequency of about 100 kHZ generated by a high-frequency power generator 56 and amplified by a power amplifier 58 is supplied through switch 50 to rotary transformer primary winding 30. The invention thus includes first power supply means in the fixed assembly for generating a first power signal. As embodied herein, the first power supply means comprises high frequency power generator 56 and power amplifier 58.

Accordingly, a composite signal shown in FIG. 5, waveform D, is transmitted to rotary transformer secondary winding 32 (equivalent to an upside cylinder) and applied to electric circuits provided inside rotary head drum 34 of rotary assembly 24.

Composite signal 55 is supplied to a full wave rectifier 60 by a switch 62 (including poles 62a and 62b) controlled by a recording/reproducing changeover signal on line 64, which is supplied by a changeover detector 66 and a switch 68 controlled by a format-drop out signal 70 also given from the changeover detector 66. Composite signal 55 is provided to full-wave rectifier 60 during the format drop-out period, and to recording/reproducing head 38 when recording during all periods except the format drop-out period. The invention thus includes second switch means for connecting the second winding to the second signal processing means during the first time period and for connecting the second winding to the second power supply means during the second time period. Preferably the second switch means comprises switch means responsive to a second control signal. As embodied herein, the second switch means comprises switch 68.

The invention further includes second signal supply means responsive to the output of the second winding for supplying the second control signal. As embodied herein, the second signal supply means comprises changeover detector 66.

The invention may also include fourth switch means responsive to a fourth control signal for connecting the second signal processing means in series between the head and the second winding. As embodied herein, the fourth switch means comprises switch 62.

During a reproducing operation, for all periods except the format drop-out period, a reproduced RF signal picked up by recording/reproducing head 38 is amplified by reproducing amplifier 26 after passing through switch 62b, and is transmitted to fixed assembly 22 by means of switch 62b and rotary transformer windings 30 and 32, where it is sent to a reproduced signal processing circuit 71 via changeover switches 50 and 46.

The invention thus includes second signal processing means mounted within the rotating assembly and connected to the head for processing the information signals. As embodied herein, the second signal processing means comprises amplifier 26.

The invention further includes first signal processing means within the fixed assembly for processing the information signals. As embodied herein, the first signal processing means comprises amplifier 44 and reproduced signal processing circuit 71.

During the format drop-out period, reproducing amplifier 26 and recording/reproducing head 38 are disconnected by changeover switches 62 and 68, and high-frequency power signal transmitted through switch 50 and rotary transformer windings 30 and 32 is applied to full-wave rectifier 60. Changeover detector 66 performs level detection at the output of rotary transformer winding 32 on the side of the rotary head drum. There is a significant difference in signal level between the recording RF signal and the high-frequency power signal, and the reproduced RF signal present at the output end of reproducing amplifier 26, thereby enabling detector 66 to supply a recording/reproducing changeover control signal on line 64 to switch 62. Further, frequency detection is performed, making use of a large difference in frequency between recording RF signal 42 and high-frequency power-signal 54, to obtain high-frequency detecting signal 70 substantially identical to the format drop-out signal (FIG. 5 waveform C), this being used as a control signal for switch 68 and applied thereto.

The invention thus includes second power supply means within the rotating assembly and connected to the first signal processing circuit for converting the first power signal to operating power for second signal processing circuit. As embodied herein, the second power supply means comprises rectifier 60, capacitor 74, and stabilizer circuit 76.

Viewed from another aspect, the invention includes power means for transmitting working power signals to the signal processing means during the second time period. As embodied herein, the power means comprises switch 50, switch 62, switch 68, changeover detector 66, and rotary transformer 28.

Figure 6:
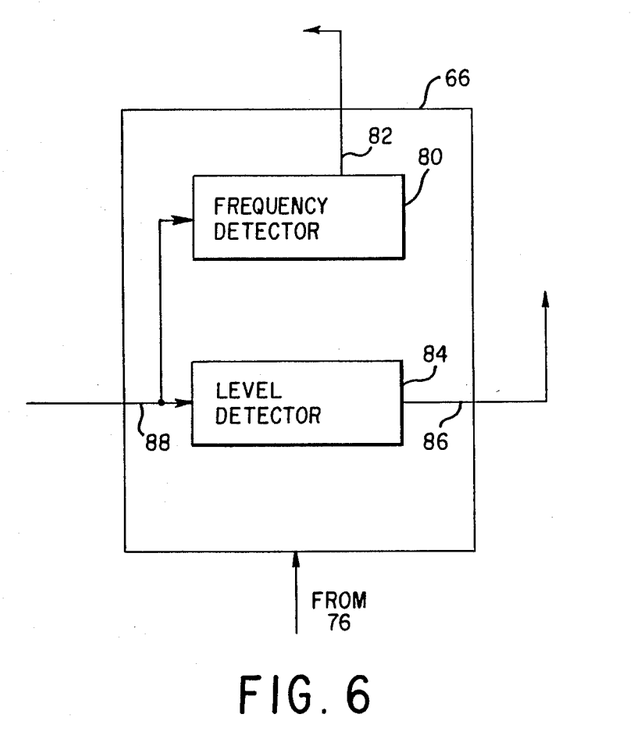
FIG. 6 is a more detailed block diagram of the changeover detector shown in FIG. 4.

Changeover detector 66 is shown in greater detail in FIG. 6. Changeover detector 66 includes a frequency detector circuit 80 having an output terminal 82 and a level detector circuit 84 having an output terminal 86. Frequency detector circuit 80 and level detector circuit 84 are both connected to a common input terminal 88. Input terminal 88 is connected to rotary transformer winding 32. When the frequency of signals present at input terminal 88 is lower than a predetermined frequency, this is an indication that high frequency power signals are present at the output of winding 32. Frequency detector circuit 80 then generates a signal on output terminal 82 to cause switch 68 to connect winding 32 (via switch 62a) to the input of rectifier 60. On the other hand, when the frequency of signals present at input terminal 88 is higher than the predetermined frequency, this is an indication that recording or reproducing operations are taking place. Frequency detector circuit 80 then generates a signal on output terminal 82 to cause switch 68 to disconnect winding 32 from the input to rectifier 60.

When the level of signals present at input terminal 88 is below a predetermined level, this is an indication that a signal reproducing operation (i.e., a playback) operation is taking place. Level detector circuit 84 then generates a signal on output terminal 86 to cause switch 62b to connect head 38 to the input of amplifier 26 and to connect winding 32 to the output of amplifier 26. If the level of signals present at input terminal 88 is above the predetermined level, this is an indication that either a recording operation is taking place or that neither reproducing nor recording is taking place and power signals are present at output of winding 32. Level detector circuit 84 then generates a signal on output terminal 86 to cause switch 62b to connect head 38 to switch 68 and to cause switch 62b to connect winding 32 to switch 68. Winding 32 is thus connected to either head 38 or to rectifier 60, depending on the state of switch 68.

The high-frequency power signal is rectified by full-wave rectifier 60, smoothed by a capacitor 74, stabilized to a certain voltage level by stabilizing circuit 76, and then used to power reproducing amplifier 26, and changeover detector 66, and changeover switch circuits 62 and 68.

Figure 7:
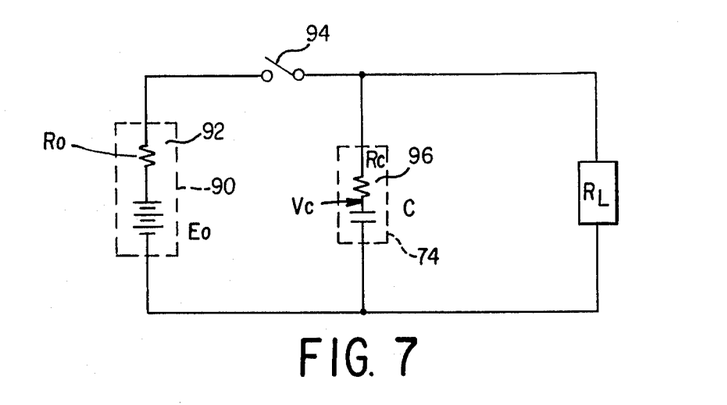
FIG. 7 is an equivalent circuit diagram of power supply circuitry shown in FIG. 4.

In an initial state when the rotary head drum is at a stop, reproducing amplifier 26 and the recording/reproducing head 38 are disconnected by means of the changeover switches 62 and 68, while the output of the rotary transformer winding 32 is connected to a full-wave rectifier 60. Up to the moment that the VCR changes to a recording or reproducing operation state from the aforementioned state, it is necessary that power be supplied to the individual circuits inside the rotary head drum. An equivalent circuit of the power supply section of this embodiment is shown in FIG. 7. That is, the output of the full-wave rectifier circuit 60 is considered to be a DC (direct current) voltage source 90 supplying an electromotive force Eo and having an internal resistor 92 of resistance Ro. Under the control of a switch 94 responsive to the format drop-out signal, source 90 charges smoothing capacitor 74 having a capacitance C and an equivalent series resistor 96 of resistance Rc, and discharging of capacitor 74, performed when switch 94 is opened through a circuit load RL.

Figure 8:
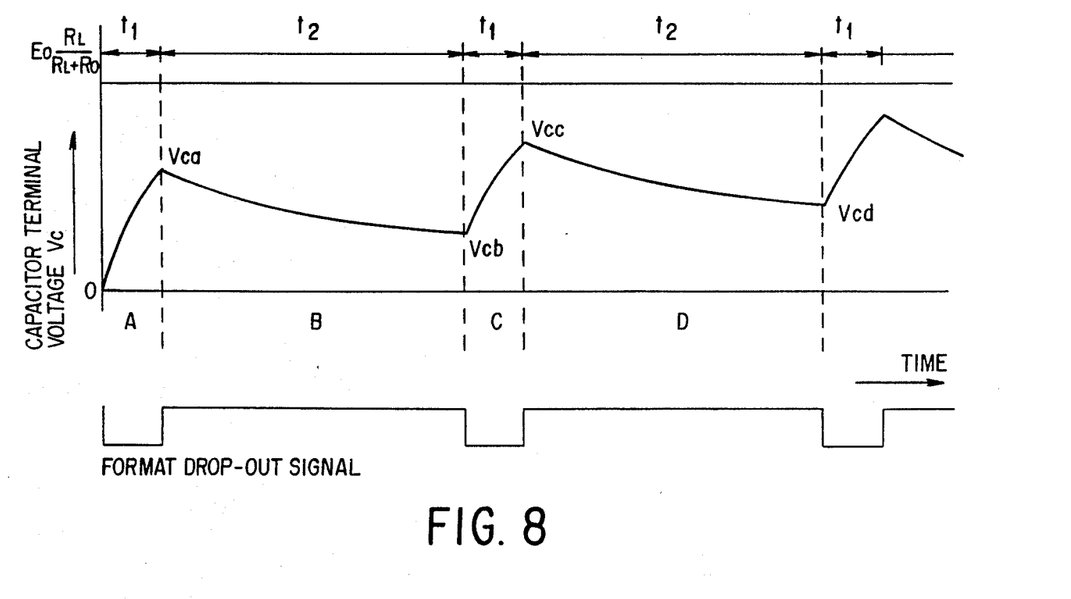
FIG. 8 is a timing diagram showing signals produced by power supply circuitry of FIG. 4.

Variation of the terminal voltage Vc as smoothing capacitor 74 is charged and discharged as the rotary head drum rotates is shown in FIG. 8, in which time interval A extends from the initial state to the moment at which discharge begins.

The terminal voltage Vca across the smoothing capacitor 74 after charging at the instant discharge begins can be expressed by $$Vca = Eo \cdot \frac{RL}{RL + Ro} \cdot \left(1 - e^{-\frac{1}{(Ro+Rc) \cdot C} \cdot t1}\right)$$

In interval B no charging is effected and capacitor 74 is discharged through the circuit load RL, thus, the terminal voltage Vcb after discharging can be expressed as $$Vcb = Vca \cdot e^{-\frac{1}{(Rc+RL) \cdot C} \cdot t2}$$

In interval C, smoothing capacitor 74 of capacitance C has some residual electric charge, and charging voltage is again applied to this capacitor from the DC voltage source Eo. Thus, the terminal voltage Vcc after charging can be expressed as $$Vcc = Eo \cdot \frac{RL}{RL + Ro} \cdot \left(1 - e^{-\frac{1}{(Ro+Rc) \cdot C} \cdot t1}\right) + Vcb \cdot e^{-\frac{1}{(Ro+Rc) \cdot C} \cdot t1}$$

In interval D, similarly to interval B, the discharging state is present, thus, the terminal voltage Vcd can be expressed as $$Vcd = Vcc \cdot e^{-\frac{1}{(Rc+RL) \cdot C} \cdot t2}$$

As will be appreciated from the above, if the charge being consumed in the circuit load is smaller than the amount of charge supplied during charging intervals, the terminal voltage VC across the smoothing capacitor 74 approaches Eo·RL/(RL+Ro)

In FIG. 8, the time interval A plus interval B, or the time of interval C plus interval D, i.e., $t_1 + t_2$, corresponds to one rotation of the rotary head drum. Hence, the terminal voltage Vcn across the smoothing capacitor 74 after the discharging of n-th rotation is represented by $$Vcn = V_{c1} + Vc(n-1) \cdot e^{-\frac{1}{(Ro+Rc) \cdot C} \cdot t1} \cdot e^{-\frac{1}{(Rc+RL) \cdot C} \cdot t2}$$

$(n = 1, 2, 3, \ldots)$

If $t_1 = 0.6$ msec and $t_2 = 16$ msec, by assuming $Eo = 15$ V and $C = 100\mu F$, and substituting practical values for Ro, Rc and Rl, a terminal voltage Vc of about 5 V can be obtained upon first rotation, about 8 V upon second rotation, about 10 V upon third rotation, 11 V upon fifth rotation, and more than 11.5 V upon the eighth or higher order rotation.

In order to properly power electric circuits provided inside the rotary head drum using the source voltage of about 10 V, about 5 rotations must precede operation of the circuits. Such limitation causes no practical problem, since a VCR takes about 5 seconds or about 300 rotations after the startup of the rotary head drum before it changes to the recording or reproducing operation state.

Figure 9:
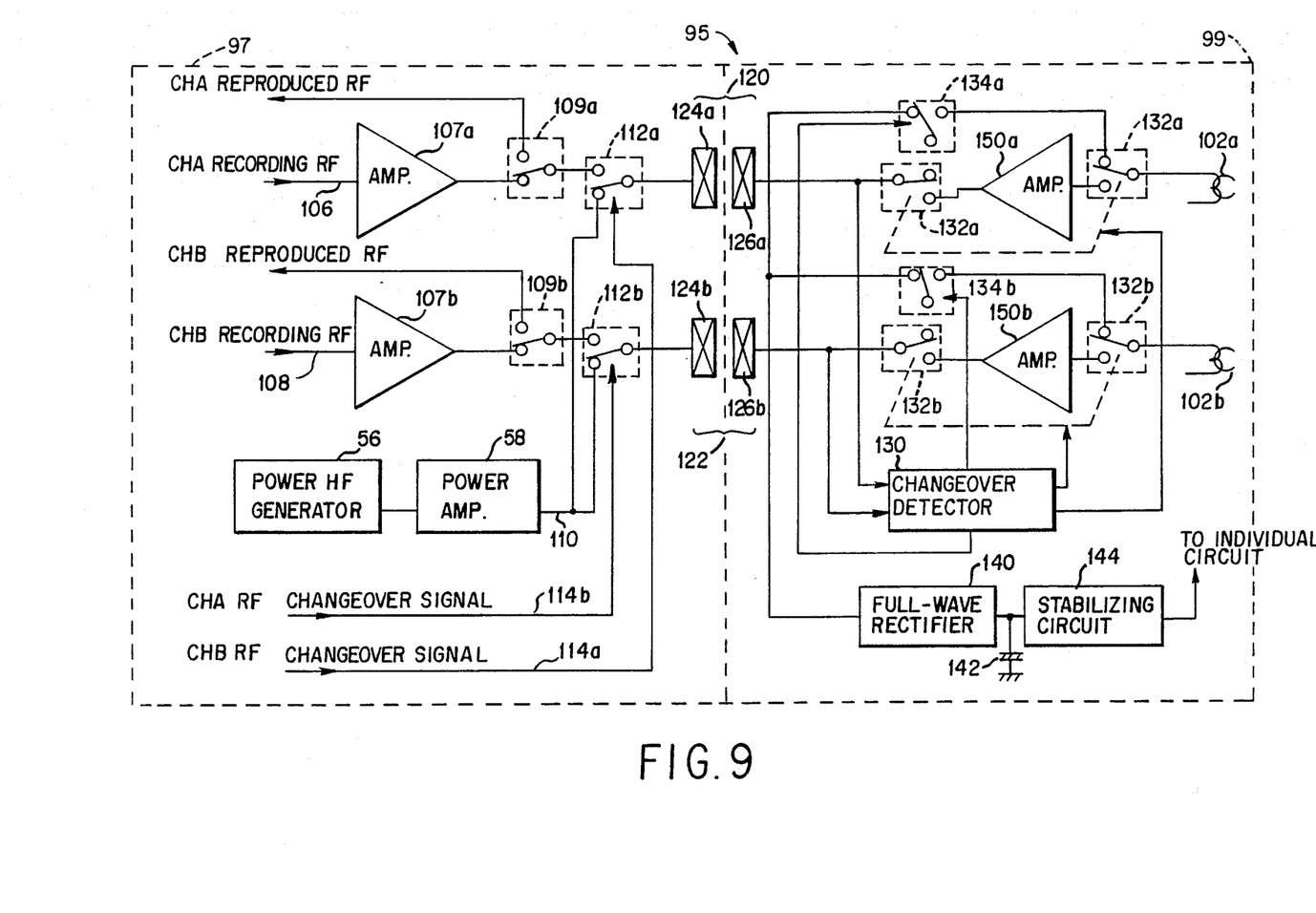
FIG. 9 is a block diagram of magnetic recording and reproducing apparatus which constitutes a second embodiment of the invention.
Figure 10:
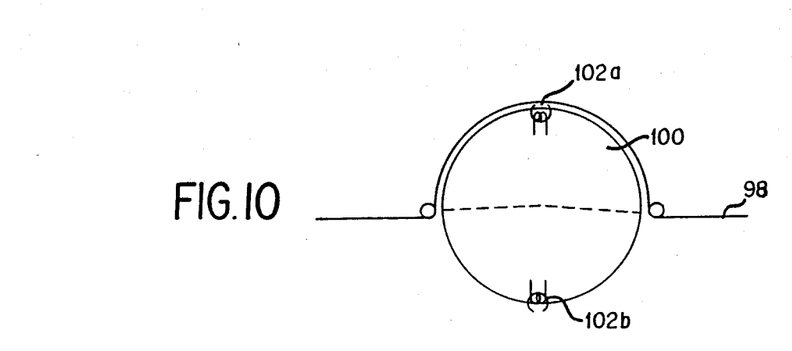
FIG. 10 is a mechanical diagram showing the relation of magnetic tape to the rotary head drum of the apparatus of FIG. 9.

A second embodiment will now be described in which the present invention is included in a ½-inch two-head helical scan VCR. FIG. 9 is a block diagram showing a fixed assembly 97 and movable assembly 99 of this embodiment, and FIG. 10 is a diagram of a rotary head drum section of the aforementioned VCR.

This embodiment is similar to the first embodiment but the contact angle (helical angle) of magnetic tape 98 is 180°+a° and two recording/reproducing heads 102a and 102b are mounted in opposite relation with 180° left therebetween. A rotary head drum 100 is rotated at 1800 rpm, and recording/reproducing heads 102a and 102b alternately create a format drop-out period of about 16 milliseconds.

Figure 11:
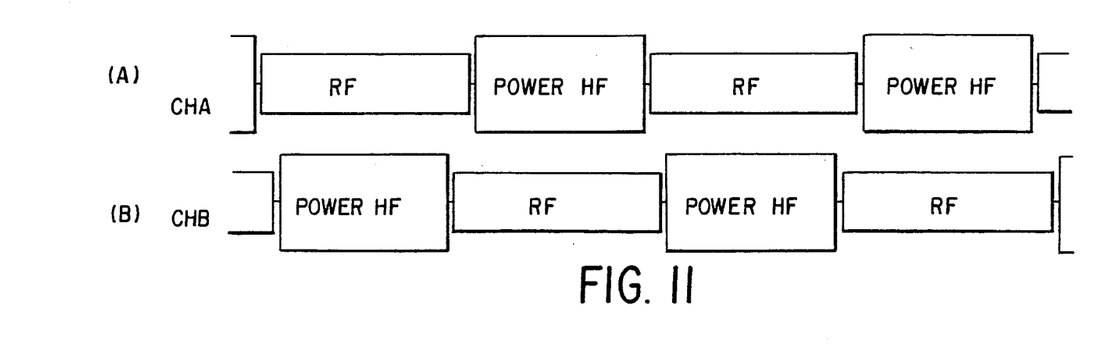
FIG. 11 is a timing diagram showing the relationship of signals produced by the apparatus of FIG. 10.

Recording RF signals 106 and 108 and a high-frequency signal 110 are switched by means of switches 112a and 112b respectively controlled by RF changeover signals 114a and 114b of channel A and channel B to produce composite signals for each channel as shown in FIG. 11. The invention as exemplified in the second embodiment includes a plurality of first switch means each corresponding to one of the heads for connecting the first signal processing means to a respective one of the first windings during the active period of the corresponding head and for connecting the first power supply means to the respective one of the first windings during a time other than the active period of the corresponding head. As embodied herein, the first switch means comprises switches 112a and 112b.

The invention as exemplified in the second embodiment further includes first signal processing means within the fixed assembly for processing the information signals. As embodied herein, the first signal processing means comprises a pair of amplifiers 107a and 107b which process recording RF signals 106 and 108.

During the format drop-out period, signals imposed with the high-frequency power signal, waveforms (A) and (B), are transmitted into rotary head drum 100 through rotary transformers 120 and 122, respectively including windings 124a and 126a. Inside rotary head drum 100, detection operations similar to those of of the first embodiment are performed by a changeover detector 130. Discrimination between the recording, reproduced, and power high-frequency power signals is performed individually for channel A and channel B to control changeover switches 132a, 134a, 132b, and 134b so that during the transmission of the power high-frequency power signal the output of the rotary transformer on the side of the rotary drum is connected to a full-wave rectifier 140.

The second embodiment of the invention includes second signal processing circuit means mounted within the rotating assembly and connected to the heads for processing the information signals. As embodied herein, the second signal processing circuit means comprises amplifiers 150a and 150b which process reproduced signals received from heads 102a and 102b, respectively.

The second embodiment of the invention further includes a plurality of second switch means each corresponding to one of the heads for connecting a respective one of the second windings to the second signal processing means during the active period of the corresponding head and for connecting the respective one of the second windings to the second power supply means during a time other than the active period of the corresponding head. As embodied herein, the second switch means comprises switches 134a and 134b.

Figure 12:
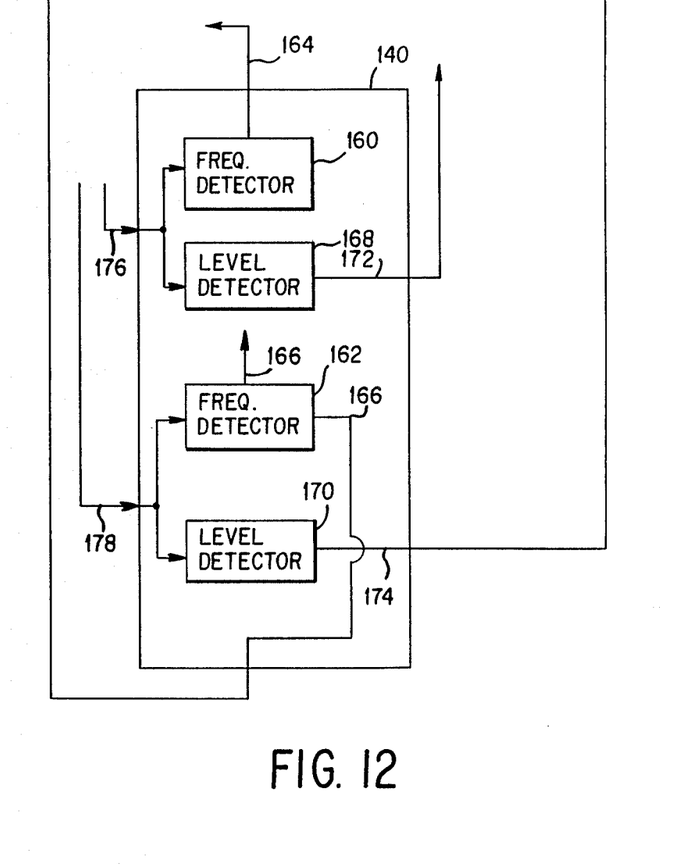
FIG. 12 is a more detailed block diagram of the changeover detector shown in FIG. 9.

Changeover detector 130 is shown in greater detail in FIG. 12. Changeover detector 130 includes a pair of frequency detector circuits 160, 162 having respective output terminals 164 and 166, and a pair of level detector circuits 168, 170 having respective output terminals 172 and 174. Frequency detector circuit 160 and level detector circuit 168 are both connected to a common input terminal 176. Input terminal 176 is connected to rotary transformer secondary winding 126a. Frequency detector circuit 162 and level detector circuit 170 are both connected to a common input terminal 178 which is connected to secondary winding 126b.

Changeover detector 130 operates on a separate channel basis in the same manner as changeover detector 66. Changeover detector 130 selectively connects heads 102a and 102b either to respective amplifiers 150a and 150b or to respective windings 126a and 126b, and connects windings 126a and 126b either to the outputs of respective amplifiers 150a and 150b or to rectifier 140, depending on whether reproducing or recording operations are taking place or power signal transmission is taking place.

Similar to the first embodiment, the output of full-wave rectifier 140 is stabilized at a certain voltage level by a smoothing capacitor 142 and a stabilizing circuit 144, and is supplied as source power to individual circuits. In this embodiment, the format drop-out period is as long as about 16 msec and is created alternately in channel A and channel B. Accordingly, the high-frequency power signal is supplied substantially continuously. Thus, a designated voltage is supplied immediately after the start of rotation of the rotary head drum.

The second embodiment of the invention thus includes second power supply means within the rotating assembly connected to the second signal processing means for converting the first power signal to operating power for the second signal processing means. As embodied herein, the second power supply means comprises rectifer 140, capacitor 142, and stabilizer circuit 144.

Figure 13:
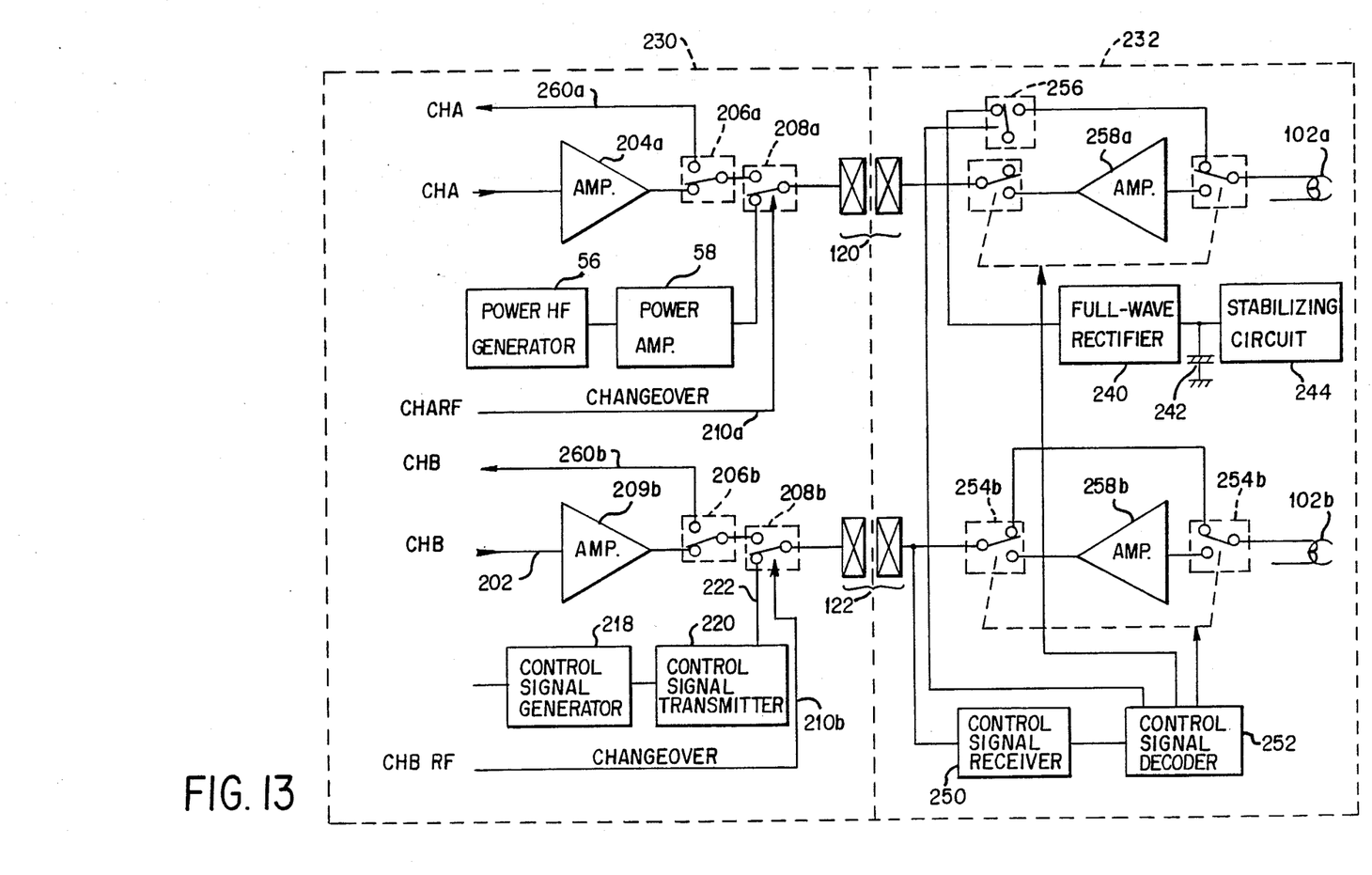
FIG. 13 is a block diagram of magnetic recording and reproducing apparatus which constitutes a third embodiment of the invention.

Since the format drop-out period is as long as described above, it is possible to supply the designated voltage after only a single rotation even if the high frequency power signal is transmitted by either channel alone. Further, it is possible to generate the control signals in a fixed assembly 230 and transmit them to a rotary assembly 232 using one of the channels.

FIG. 13 is a block diagram of such apparatus. As can be seen in FIG. 13, recording RF signals 200 and 202 respectively supply channels A and B and are supplied to respective amplifiers 204a and 204B. The output of amplifiers 204a and 204B are respectively supplied through switches 206a, 208a and 206b, 208b to respective transformers 120 and 122. High frequency power signal 110 is supplied to switch 208a and is transmitted, under control of a channel A RF changeover signal 210A, through switch 208a and transformer 120 to rotary assembly 24.

A control signal is generated by a control signal generator 218 and transmitted by a control signal transmitter 220 to switch 208b. Under control of a channel B RF changeover signal 210B, a control signal 222 is supplied through switch 208b and transformer 122 to rotary assembly 24.

Figure 14:
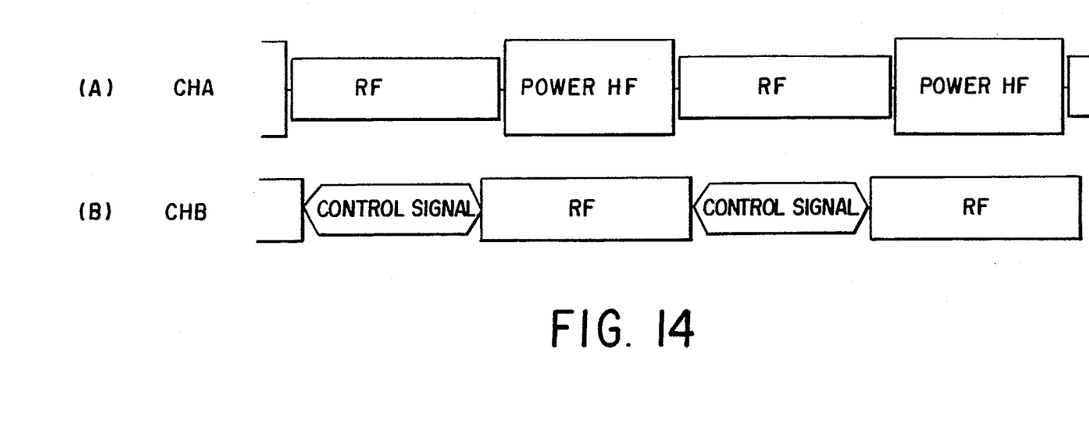
FIG. 14 is a timing diagram showing the relationship of signals produced by the apparatus of FIG. 13.

Signals transmitted over transformers 120 and 122 by the embodiment of FIG. 13 are respectively shown in waveforms A and B of FIG. 14. As can be seen therein, the channel A signal transmitted over transformer transmits a high frequency power signal during the format dropout period of channel A and transmits RF information signals (either recording or reproducing) during all other periods. The channel B signal transmitted over transformer 122 in the embodiment of FIG. 13 includes a control signal transmitted during format dropout periods of channel B and RF information signals (either recording or reproduced signals) during all other periods.

The control signal transmitted over transformer 122 is supplied to a control signal receiver 250 and supplied to a control signal decoder 252. Decoder 252 supplies control signals to switches 254a, 254b, and 256. Switches 254a and 256 supply a high frequency power signal to rectifier 240 during format dropout periods of channel A. During recording operations, switches 254a and 256 supply recording RF signals to head 102a. During reproducing operations, switches 254a and 256 supply reproduced RF signals from head 102a through an amplifier 258a to transformer 120, and then through switches 208a and 206a to supply a reproduced channel A RF signal 260a.

During format dropout periods of channel B, control signals are supplied to control signal receiver 250 and control signal decoder 252. During recording operations on channel B, switches 254b are responsive to record/reproduce control signals to supply recording RF signals to head 102b.

During reproducing operations, switches 254b are responsive to record/reproduce control signals to supply reproduced RF signals from head 102b through amplifier 258b to transformer 122, and then through switches 208b and 206b to form a reproduced channel B RF signal 260b. The invention may thus include means for connected to the other second winding and to the first and second rotating assembly switch means for generating the switching control signals and the record/reproduce control signals. As embodied herein, the signal generating means comprises control signal receiver 250 and control signal decoder 252.

As described with reference to each of the embodiments, a format drop-out period exists during which the head does not contact the magnetic tape and no recording and reproducing action can be performed due to the intrinsic structure of the rotary head type VCR. This format dropout period can be effectively utilized to supply source power for the electric circuits provided inside the rotary head drum. Thus, power which was hitherto transmitted by means of mechanical contacts, such as slip rings and brushes, can be supplied without use of contacts. Consequently, it is possible to eliminate several problems associated with mechanical contacts, such as imperfect contact caused by wear or dirt, and generation of noise resulting from unstable operation of circuits, thereby reducing maintenance requirements. In addition, since this invention utilizes the rotary transformer windings already used for the recording and reproduced signals as the means for power transmission, the rotary head drum needs no additional mechanical parts. Thus, conventional parts, including slip rings and brushes are eliminated, thereby simplifying the structure and reducing costs.

It will be apparent to those skilled in the art that various modifications and variations can be made in the information signal recording and reproducing apparatus and method of this invention without departing from the spirit or scope of the present invention. The present invention covers such modifications and variations which are within the scope of the appended claims and their equivalents.

What is claimed is:

1. Apparatus for recording and reproducing information signals to and from magnetic tape, comprising:
   a rotating assembly rotatable through a plurality of angular positions during repetitive cycles that include first and second time periods;
   a fixed assembly;
   a magnetic head mounted on the rotating assembly for recording and reproducing information signals to and from magnetic tape;
   a rotary transformer having a first winding mounted on the fixed assembly and a second winding mounted on the rotating assembly;
   first signal processing means within the fixed assembly for processing the information signals;
   first power supply means in the fixed assembly for generating a first power signal;
   first switch means for connecting the first winding to the first signal processing means during the first time period and connecting the first winding to the first power supply means during the second time period;
   second signal processing means mounted within the rotating assembly and connected to the head for processing the information signals;
   second power supply means within the rotating assembly and connected to the second signal processing means for converting the first power signal to operating power for the second signal processing means; and
   second switch means for connecting the second winding to the second signal processing means during the first time period and for connecting the second winding to the second power supply means during the second time period.

2. Apparatus as recited in claim 1 wherein the second signal processing means comprises an amplifier.

3. Apparatus as recited in claim 1 wherein the first power supply means comprises a high frequency generator and a power amplifier.

4. Apparatus as recited in claim 1 wherein the second power supply means comprises a rectifier and a stabilizing circuit.

5. Apparatus as recited in claim 1 wherein the first switch means comprises switch means responsive to a first control signal for connecting the first winding to the first signal processing means during the first time period and for connecting the first winding to the first power supply means during the second time period, and the apparatus includes first signal supply means responsive to the angular position of the rotating assembly for supplying the first control signal.

6. Apparatus as recited in claim 1 wherein the second switch means comprises switch means responsive to a second control signal for connecting the second winding to the second signal processing means during the first time period and for connecting the second winding to the second power supply means during the second time period, and the apparatus comprises second signal supply means responsive to the output of the second winding for supplying the second control signal.

7. Apparatus as recited in claim 1 wherein:
   the first signal processing means comprises a reproduction signal processing circuit and a recording signal processing circuit;
   the apparatus further comprises third switching means responsive to a third control signal for selectively connecting the reproduction signal processing circuit and the recording signal processing circuit to the first switch means; and
   the apparatus further comprises fourth switch means responsive to a fourth control signal for connecting the second signal processing means in series between the head and the second winding.

8. Apparatus for reproducing information signals from a magnetic medium, comprising:
   a magnetic head for reproducing the information signals from the magnetic medium;
   a rotary head drum carrying the head, the rotary head drum rotating through repetitive cycles, each cycle including a first and a second time period, and operable during the first time period and inoperable during the second time period to reproduce the information signals from the magnetic medium;
   signal processing means within the rotary head drum for processing the information signals;
   a rotary transformer for communicating the reproduced information signals from the head; and
   power means for transmitting working power signals to the signal processing means during the second time period and during inoperability of the rotary head drum to reproduce said information signals.

9. Apparatus for recording and reproducing information signals to and from magnetic tape, comprising:
   a rotating assembly rotatable through a plurality of angular positions during repetitive cycles;
   a plurality of magnetic heads each mounted on the rotating assembly and operable during an active time period during each cycle to record and reproduce the information signals to and from magnetic tape;
   a fixed assembly;
   first signal processing means within the fixed assembly for processing the information signals;
   first power supply means for generating a first power signal;
   a plurality of rotary transformers each having a first winding mounted on the fixed assembly and a second winding mounted on the rotating assembly;
   second signal processing circuit means mounted within the rotating assembly and connected to the heads for processing the information signals;
   a plurality of first switch means each corresponding to one of the heads for connecting the first signal processing means to a respective one of the first windings during the active period of the corresponding head and for connecting the first power supply means to the respective one of the first windings during a time other than the active period of the corresponding head;
   second power supply means within the rotating assembly and connected to the second signal processing means for converting the first power signal to operating power for the second signal processing means; and a plurality of second switch means each corresponding to one of the heads for connecting a respective one of the second windings to the second signal processing circuits during the active period of the corresponding head and for connecting the one of the second windings to the second power supply means during a time other than the active period of the corresponding head.

10. Apparatus for recording and reproducing information signals to and from magnetic tape, comprising:

a rotating assembly rotatable through a plurality of angular positions during repetitive cycles;

first and second magnetic heads each mounted on the rotating assembly and operable during an active time period during each cycle to record and reproduce the information signals to and from magnetic tape;

a fixed assembly;

first signal processing means within the fixed assembly for processing the information signals;

first power supply means for generating a first power signal;

a rotary transformer having a pair of first windings mounted on the fixed assembly and a pair of second windings mounted on the rotating assembly;

second signal processing means mounted within the rotating assembly and connected to the heads for processing the information signals;

means for supplying control signals;

first fixed assembly switch means for connecting the first signal processing means to a corresponding one of the pair of first windings during the active time period for the first head and for connecting the power means to the one first winding at a time other than the active time period for the first head;

second fixed assembly switch means for connecting the first signal processing means to the other one of the pair of first windings during the active time period for the second head and for connecting the control signal supplying means to the other first winding at a time other than the active time period for the second head;

second power supply means within the rotating assembly connected to the second signal processing means for converting the first power signal to operating power for the second signal processing means;

first rotating assembly switch means responsive to switching control signals for connecting the second signal processing means to a corresponding one of the pair of second windings during the active period for the first head and for connecting the second power supply means to the corresponding second winding at a time other than the active time period for the first head;

second rotating assembly switch means responsive to record/reproduce control signals for selectively connecting the second signal processing circuit and the second head to the other of the second windings during the active period for the second head; and means for connected to the other second winding and to the first and second rotating assembly switch means for generating the switching control signals and the record/reproduce control signals.

11. A method for supplying operating power to signal processing circuits mounted in a rotating head assembly of information signal recording and reproducing apparatus, the apparatus including a rotary transformer having a fixed winding and a rotating winding for transmitting information signals from the rotating head assembly, the head assembly operating over repetitive cycles, each cycle including a first time period when recording and reproducing operations may take place and a second time period when recording and reproducing operations are not possible, the method comprising the steps of:

generating power signals;

transmitting information signals from the rotating head assembly only during the first time period; and transmitting power signals to the rotating head assembly only during the second time period; and converting the power signals to operating power for the signal processing circuits.

* * * * *